(12) United States Patent
Dalal et al.

(10) Patent No.: US 8,068,695 B2
(45) Date of Patent: Nov. 29, 2011

(54) POSITIONAL DISTORTION COMPENSATION

(75) Inventors: Edul N. Dalal, Webster, NY (US);
Wencheng Wu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 460 days.

(21) Appl. No.: 12/266,624

(22) Filed: Nov. 7, 2008

(65) Prior Publication Data
US 2010/0119158 A1 May 13, 2010

(51) Int. Cl.
*G06K 9/32* (2006.01)
(52) U.S. Cl. .................................. 382/293; 382/295
(58) Field of Classification Search .............. 382/293, 382/295, 296, 297, 274, 275, 269; 358/3.26, 358/406, 448, 461, 463, 471
See application file for complete search history.

(56) References Cited

U.S. PATENT DOCUMENTS

| 5,497,236 A | 3/1996 | Wolff et al. |
| 6,754,398 B1 * | 6/2004 | Yamada .................... 382/260 |
| 7,170,644 B2 | 1/2007 | Loce et al. |

* cited by examiner

*Primary Examiner* — Brian Le
(74) *Attorney, Agent, or Firm* — Fay Sharpe LLP

(57) ABSTRACT

A de-warp map is generated by applying principal component analysis (PCA) to vectors describing aspects of identified features of an object in an image. PCA provides vectors and coefficients describing curvature or image warping at selected points in the image. Estimates of the warping of the image generally are generated by interpolation and/or extrapolation from the vectors and coefficients provided by PCA. In some applications only two features need be identified. For example, the complicated curvature of the facing pages of an open book can be characterized by two vectors describing positions of top and bottom edges of the book. In such applications PCA can reduce to vector subtraction to determine a basis vector, vector addition and scaling to determine an average vector and simple assignment of known coefficient values. The de-warping map can be used to generate a de-warped version of the image.

20 Claims, 12 Drawing Sheets

FIG. 1
(PRIOR ART)

POSITIONAL DISTORTION COMPENSATION

BACKGROUND

The presently disclosed embodiments are directed toward correcting positional distortion in an image of an object. Embodiments will be described with references to images of pages of bound books that are generated photographically or through the use of an image scanner. However, embodiments will find use in other image distortion and image manipulation applications.

With reference to FIG. 1, often, when a curved surface is imaged, a spatial or positional distortion of information in that image can occur. For example, in an image 104 of an opened book 108, the transformation from three-dimensional object space to two-dimensional image space causes a distortion. For example, portions of the object that were horizontal can appear to be curved upward or downward. For instance, a top edge 112 of a first page of the book 108 can appear to be curved downward in terms of the two-dimensional image 104. A bottom edge 114 can appear to curve upward. Similar distortions can be seen in other features of the book object. For example, lines of text in an upper portion 118 of the page also exhibit a downward curvature. Lines of text in a lower portion 122 of the page exhibit an upward curvature.

Such distortions can be inconvenient. In some instances, they make information on the object difficult to perceive. For example, text distorted in this way can be difficult for a human observer to read. Moreover, the accuracy and speed of optical character recognition software can be adversely affected by such distortions.

Accordingly, efforts have been made to develop mechanisms for correcting or compensating for such distortions.

For example, U.S. Pat. No. 5,497,236 by Wolff et al. discusses a method and apparatus for correcting for splay. According to Wolff, a document distorted by the curvature of a page of text away from a platen is converted to a digital image. The digital image is manipulated to remove the distortion by fitting lines of text in an unsplayed portion to a skew line, which represents the deviation of lines of text in the digital image from horizontal. Then the splay is determined for each line of text. Wolff then searches for a break point, which is that point in the image corresponding to the point on paper where the page begins to separate from the scanning platen. In embodiments of Wolff, a break point is found by independently evaluating each line and finding the point where an edge line separates from a skew line. This break point is used to identify the splayed portion of each edge line. The splayed portion of each edge line is fit to an exponential curve.

The processing of Wolf includes a number of additional procedures. The individual curve fitting of exponentials to each splayed portion is relatively time consuming. The situation is further aggravated with each additional splayed region (e.g., from a facing page or outer edge of a curled or curved document).

U.S. Pat. No. 7,170,644 B2 to Loce et al., entitled "Method and System for Reducing Distortion in Scanned Images," discloses methods and systems for de-warping images that include image processing using an optics model and an illumination model which works well when the image is relatively uniform, such as a page of text at a constant point size and color.

The need remains for systems and methods to compensate for object curvature that are fast and are applicable to a broad class of images.

INCORPORATION BY REFERENCE

U.S. Pat. No. 7,170,644 B2 to Loce et al. and U.S. Pat. No. 5,497,236 by Wolff et al. are incorporated herein by reference in their entirety.

BRIEF DESCRIPTION

A method of processing image data of an image of an object to remove or compensate for unwanted curvature can include performing principal component analysis (PCA) on vectors describing features of the object and using the results of the PCA to generate a de-warping map to be used to de-warp the image.

For instance, the method can include identifying, in the image, a plurality of respective line-like features of the object, the plurality of line-like features extending in a first direction and being located at respective separate positions in a second direction that is orthogonal to the first direction, each respective line-like feature having a curvature that is representative of a curvature of the image at the respective position.

A plurality of respective vectors representing points in the image defined by each respective line-like feature of the plurality of respective line-like features can be determined, wherein each vector of the plurality of respective vectors characterizes the curvature of the image at the respective position in the second direction of the respective line-like feature and wherein for selected positions in the first direction each respective vector includes a corresponding position of the respective line-like feature in the second direction.

A first subset of the plurality of vectors can be selected, the first subset including at least portions of selected vectors of the plurality of vectors, the respective portions including those portions of each vector in the first subset corresponding to selected positions in the first direction, the selected positions being positions for which each respective vector in the first subset includes valid feature position information and defining a first area of interest;

Principal component analysis can then be performed on the first subset of the plurality of vectors, thereby determining a first average vector, a first at least one respective basis vector and a respective first plurality of sets of at least one coefficient, each respective set of at least one coefficient corresponding to the respective position in the second direction of an associated respective line-like feature portion corresponding to a respective vector portion included in the first subset of the plurality of vectors, a combination of the first at least one respective basis vector, a selected respective set of at least one first coefficient and the first average vector providing an estimate of positions in the second direction for the respective line-like feature portion associated with the selected respective set of at least one first coefficient.

A first function describing a relationship of the respective first plurality of sets of at least one coefficient to position in the second direction is determined, as is a first set of positions of interest in the second direction.

For each position of interest in the first set of positions of interest in the second direction, a first set of at least one respective coefficient for the at least one respective first basis vector is determined according to the determined first function and the position in the second direction of the position of interest and position estimates associated with the positions of interest are determined.

That is, for each position of interest in the second direction in the first set of positions of interest, a first set of position estimates in the second direction is determined, the first set of position estimates including an estimate, for each position corresponding to the selected positions in the first direction for which the vector portions included in the first subset of the plurality of vectors include valid feature position information, from a combination of the at least one respective first basis vector, the at least one calculated first set of at least one respective coefficient corresponding to the position of interest in the second direction and the first average vector.

The image data associated with the first area of interest can then be de-warped according to the respective estimated first sets of positional estimates, thereby generating a compensated version of the at least the first area of interest with the unwanted curvature compensated for or removed.

The de-warped image data can then be stored or rendered (e.g., displayed or printed).

An image processor that is operative to process image data of an image of an object to remove or compensate for unwanted curvature in accord with embodiments of the method described above can include a feature identifier, a feature vector determiner, a vector selector, a principal component analyzer, a correction estimator, an image de-warper and optionally, an image storage device and/or a rendering device.

The feature identifier that can be operative to identify a plurality of respective line-like features of the object, the plurality of line-like features extending in a first direction and being located at respective separate positions in a second direction that is orthogonal to the first direction, each respective line-like feature having a curvature that is representative of a curvature of the image at the respective position;

The feature vector determiner that can be operative to determine a plurality of respective vectors representing points in the image defined by each respective line-like feature of the plurality of respective line-like features, wherein each vector of the plurality of respective vectors characterizes the curvature of the image at the respective position in the second direction of the respective line-like feature and wherein for selected positions in the first direction each respective vector includes a corresponding position of the respective line-like feature in the second direction;

The vector selector that can be operative to select at least one respective subset of the plurality of vectors, the at least one respective subset including at least respective portions of selected vectors of the plurality of vectors, the respective portions including those portions of each vector in the at least one respective subset corresponding to selected positions in the first direction, the selected positions being positions for which each respective vector in the at least one respective subset includes valid feature position information and defining respective areas of interest;

The principal component analyzer that can be operative to perform principal component analysis on the at least one respective subset of the plurality of vectors, thereby determining at least one respective average vector, at least one respective set of at least one respective basis vector and at least one respective set of at least one coefficient, each respective set of at least one coefficient corresponding to the respective position in the second direction of an associated respective line-like feature portion corresponding to a respective vector portion included in the respective at least one subset of the plurality of vectors, a combination of the respective set of at least one respective basis vector, a selected respective set of at least one respective coefficient and the respective average vector providing an estimate of positions in the second direction for the respective line-like feature portion associated with the selected respective set of at least one respective coefficient;

The correction estimator that can be operative to determine at least one respective function describing respective relationships of the respective pluralities of respective sets of at least one coefficient to position in the second direction, to determine at least one respective set of positions of interest in the second direction, and for each position of interest in the respective sets of positions of interest in the second direction: to calculate respective sets of at least one respective coefficient for the respective at least one respective basis vector according to the determined at least one respective function and the position in the second direction of the position of interest; and to determine, for each position of interest in the second direction in a respective set of positions of interest, a respective set of position estimates in the second direction, the respective set of position estimates including an estimate, for each position corresponding to the selected positions in the first direction for which the vector portions included in the respective subset of the plurality of vectors include valid feature position information, from a combination of the respective at least one respective basis vector, the at least one calculated respective set of at least one respective coefficient corresponding to the position of interest in the second direction and the respective average vector;

The image de-warper that can be operative to de-warp image data associated of the image according to the respective sets of position estimates, thereby generating a compensated version of the image data with unwanted curvature compensated for or removed and the image data storage device would be operative to store the compensated version of the image data and the rendering device that would be operative to render the compensated version of the image data.

BRIEF DESCRIPTION OF THE DRAWINGS

FIG. 1 is an image of an object which was curved in relation to an imaging device such as a document scanner or camera and which includes line-like features which appear to be curved, distorted or warped.

DETAILED DESCRIPTION

Figure 2:
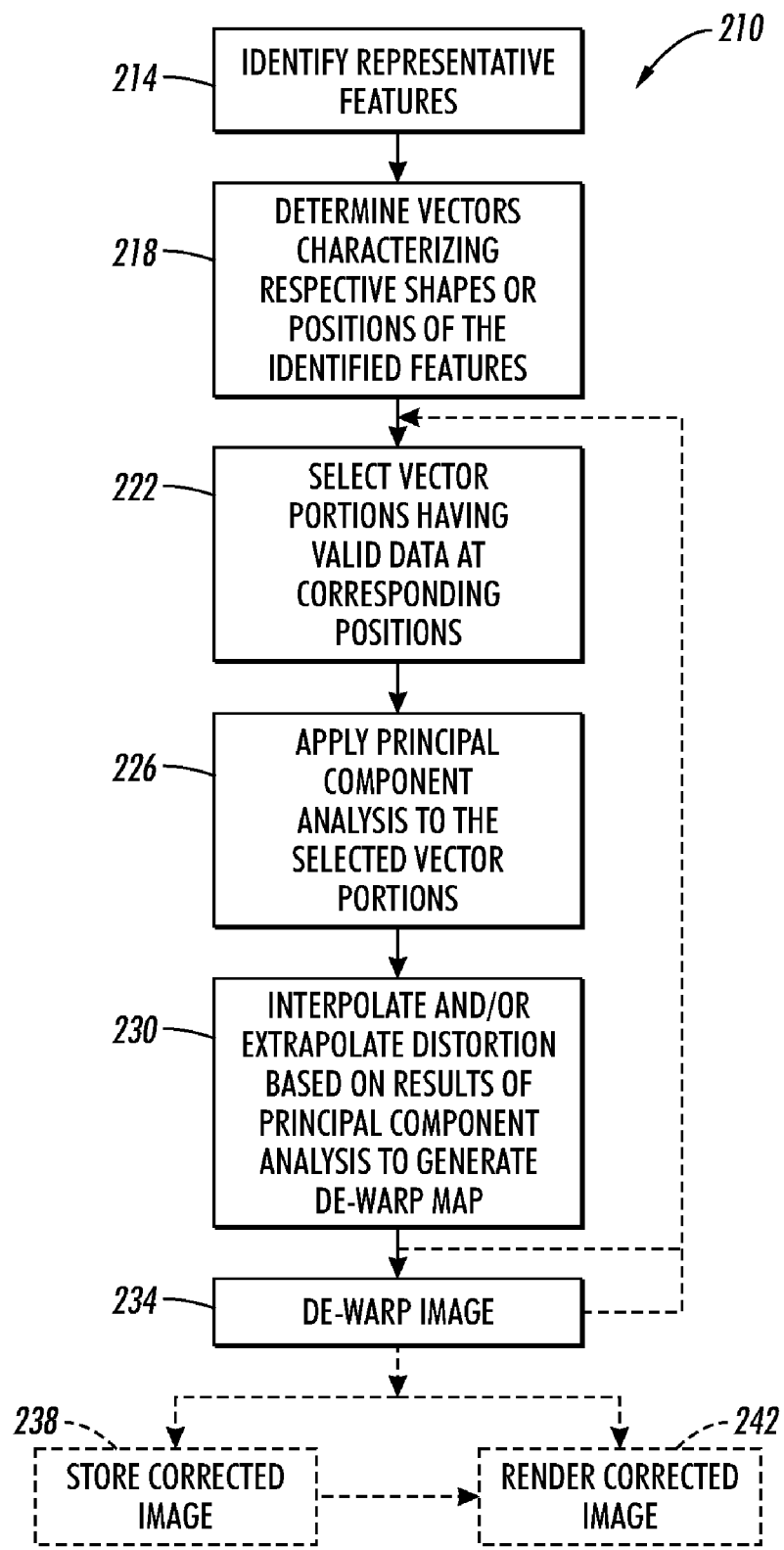
FIG. 2 is a flow chart outlining a method for de-warping or generating a compensated or de-warped version of an image.

With reference to FIG. 2, a method 210 of processing image data of an image of a curved object to remove or compensate for unwanted curvature can include identifying 214 representative features of the object, determining 218 vectors characterizing respective shapes or positions of portions of the identified features, selecting 222 portions of the determined vectors that have valid data at corresponding positions and applying 226 principal component analysis to the selected vector portions. The output of the principal component analysis (PCA) includes at least one basis vector and at least one corresponding or respective coefficient, respective sets of at least one coefficient corresponding to each of the selected vector portions. The principal component analysis also generates a mean or average vector describing a mean or average of the selected 222 vectors. Together, the average vector, at least one basis vector and sets of coefficients provide an estimate of the curvature or distortion of the object at positions in the image represented by the selected vector portions. However, in order to de-warp an image, it is desirable to have an estimate of the curvature or distortion at most if not every position in the image.

Figure 11:
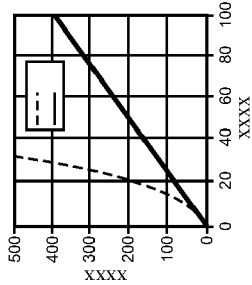
FIG. 11 is a compensated version of the image of FIG. 1.

Accordingly, the method 210 includes interpolating/extrapolating 230 additional, and optionally alternative, distortion estimates based on output from the application 226 of PCA. The output or de-warp map generated by this interpolation/extrapolation 230 can then be used to de-warp 234 at least a portion of the image or a first area of interest associated with the selected 222 vector portions. The de-warped image or image portion can be stored 238 or used to render 242 a corrected or compensated version of the image (e.g., see FIG. 11) image.

Identifying 214 representative features can include identifying, in the image, a plurality of respective line-like features of the object, the plurality of line-like features extending in a first direction (e.g., a horizontal or x direction) and being located at respective separate positions in a second direction (e.g., vertical or y direction) that is orthogonal to the first direction. The phrase—line-like feature—is used here in recognition that in the image, the features are likely to be distorted in that they have a curvature that is representative of a curvature or distortion of the image at the respective position.

Figure 3:
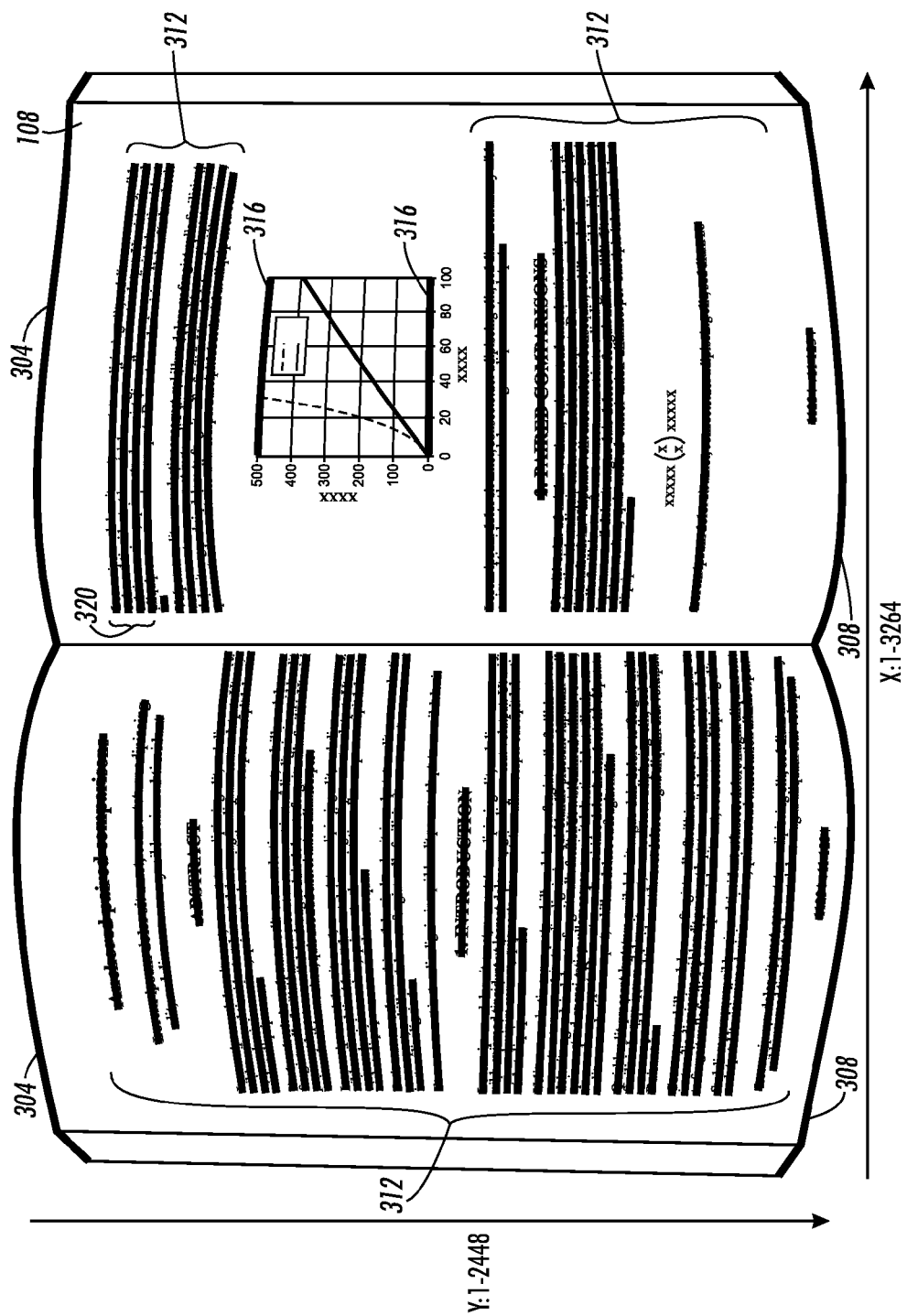
FIG. 3 depicts identified line-like features of the object depicted in FIG. 1.

For example, referring to FIG. 3, known or yet-to-be developed image segmentation techniques are used to identify at least two of a top edge 304, a bottom edge 308, lines of text 312 and horizontal lines 316 associated with graphic elements. If necessary, the image can be de-skewed by known or yet-to-be developed techniques prior to the identification 214 of such line-like features to help ensure that an assumption that line-like features that are identified 214 are meant to extend in the first direction (e.g., be horizontal) is valid.

Once features are identified 214, vectors characterizing the respective shape or positions of the identified 214 features can be determined 218. For example, for illustration purposes, the image 104 of the open book 108 can be considered to be made up of 3,264 positions in a first direction (e.g., x) and 2,448 positions in a second direction (e.g., y). Each identified 214 feature can be represented as a vector containing representative y positions of the feature sampled at each position in the first direction (e.g., x=1, 2, . . . , 3264). That is, feature i can be represented as a 1×3264 vector of the form:

$$Y_i = [NA \ldots NA \ldots NA\, y_{ij_0} \ldots y_{ij_1}\, NA \ldots NA]$$

where, feature i begins at $x=j_0$ and ends at $x=j_1$ and there is no data available at other x locations (represented by NA). Such vectors can be determined 218 for all or some of the identified 214 representative features.

Principal component analysis (PCA) is a technique for approximating data with lower dimensionality. In the present application, PCA is used to provide a convenient way to describe the curvature or distortion in selected portions of an image. With an input of a plurality of one dimensional vectors, the output of PCA processing is an average vector representing the average of the input vectors, at least one basis vector characterizing deviations from that average vector and coefficients which act as scaling factors on the basis vector. At least one corresponding coefficient is provided for each input vector. An additional corresponding coefficient is provided for each additional basis vector generated by PCA. A combination of the average vector and the at least one basis vector multiplied by a respective set of coefficients associated with a particular input vector provides an estimate of the original input vector. Accordingly, it is appropriate that each input vector include the same number of elements. Additionally, in a method for compensating for distortions in a second direction (e.g., y), it is appropriate that the elements of each input vector represent position information at corresponding positions in the first direction (e.g., x).

Accordingly, selecting 222 vector portions includes selecting vector portions having valid data at corresponding positions. For instance, as will be explained in greater detail below, selecting 222 vector portions includes selecting a first subset of the plurality of vectors, the first subset including at least portions of selected vectors of the plurality of vectors, the respective portions including those portions of each vector in the first subset corresponding to selected positions in the first direction (e.g., x), the selected positions being positions for which each respective vector in the first subset includes valid feature position information. The selected vectors or vector portions can be considered to define a first area of interest of the image. The first area of interest can include the entire image or a portion of the image.

For instance, with continued reference to FIG. 3, it can be seen that the top 304 and bottom 308 edges include valid feature position information for almost every position in the first (e.g., x) direction. Additionally, many of the identified lines of text (e.g., 320) extend across a substantial portion of their respective page and respective vectors thereof would have valid data at corresponding positions in the first direction (e.g., x), while other features and lines of text (e.g., 316, 324) are shorter and their corresponding vectors would have valid data at fewer and not necessarily corresponding positions.

As can be seen, selecting 222 vector portions can proceed in a number of different ways. One illustrative technique begins with a thresholding according to a number of contiguous valid data positions.

For example, vectors having less than 1,000 elements including valid data (e.g., $j_1-j_0$ less than 1,000) are rejected.

Figure 4:
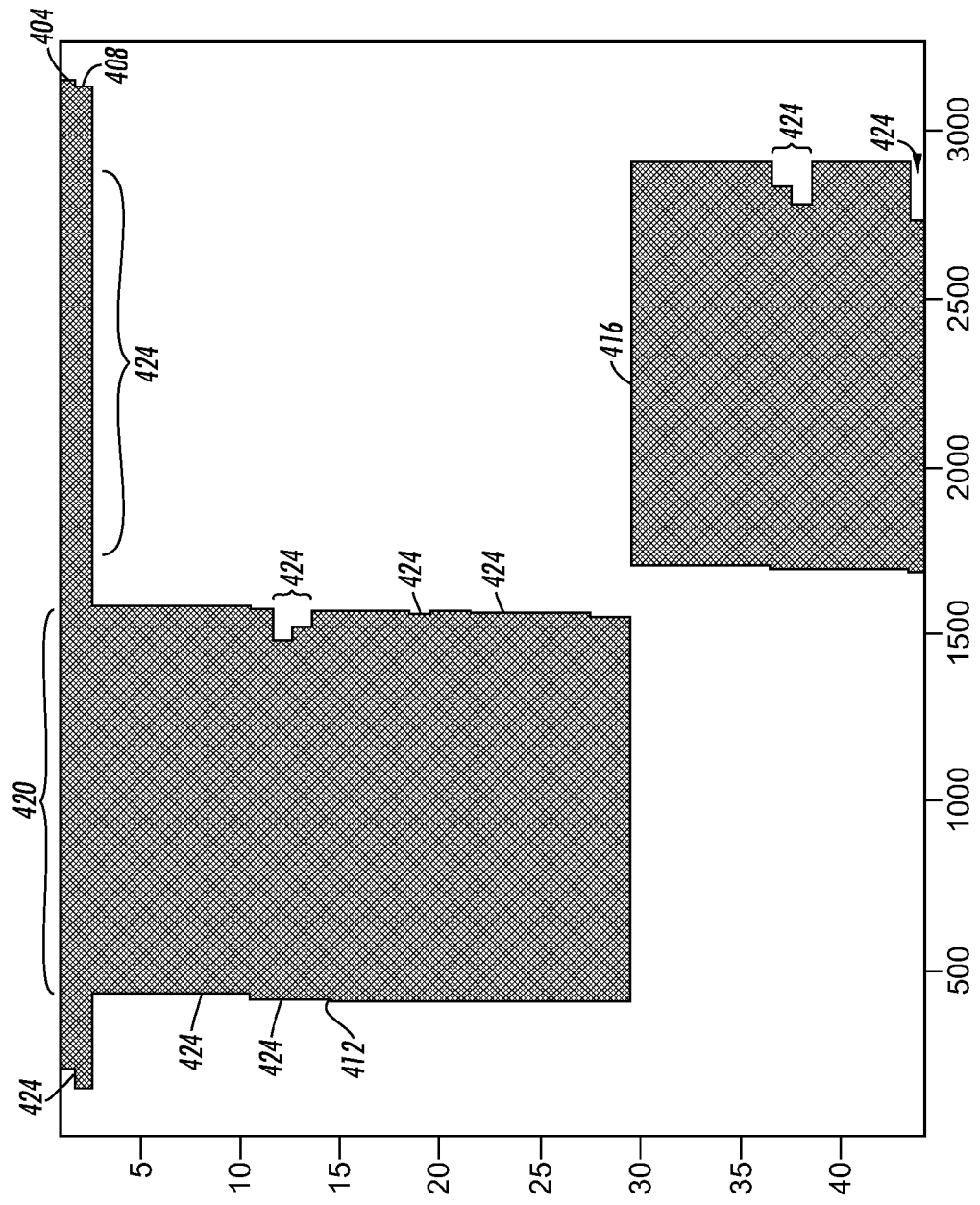
FIG. 4 illustrates regions of valid and invalid data in vectors describing aspects of selected line-like features identified in FIG. 3.

In the present example (e.g., FIG. 3), this would reduce the number of feature vectors from 66 to 44. A diagram of the 44 vectors is provided in FIG. 4 which depicts positions associated with valid data as shaded areas and positions associated with invalid data in white, and illustrates the top edge vector 404 and bottom edge vector 408 at the top of the diagram followed by illustrations 412 of vectors associated with features on the left page of the book 104 and illustrations 416 of vectors associated with the right page of book 108.

From this diagram, one can begin to see that with some additional editing, the set of vectors 412 associated with features on the left page or the set of vectors 416 associated with the right page might be selected 222 as defining an area of interest. Furthermore, portions 420 of the top edge vector 404 and bottom edge vector 408 might be selected 222 to be included with portions of the right and left page text vectors 412, 416, respectively, because they include valid data at positions in the first direction (x) where a portion of the right and left page text vectors 412, 416 have valid data.

As indicated above, PCA is most effective and the common forms of PCA can best be applied when all the vectors being considered include valid data in the same or corresponding vector element positions (e.g., at vector element positions corresponding to the same positions in the x or first direction). As can be seen from a review of FIG. 4, the identified vectors of FIG. 4 do not include valid data at corresponding positions. For example, the block of vectors illustrated at 412 do not include valid data at positions in the first direction (e.g., x), above about position 1550 or below about position 400. Additionally, the group of vectors identified generally at 416 do not include valid data at positions below about x=1700 or above about position 2900. Even within vector groups (e.g., 412, 416), there are regions or sets of vectors 424 that do not include valid data at positions where other members of the group do include valid data.

These issues can be addressed through techniques such as image/vector segmentation, vector truncation and/or further vector selection 222.

Figure 5:
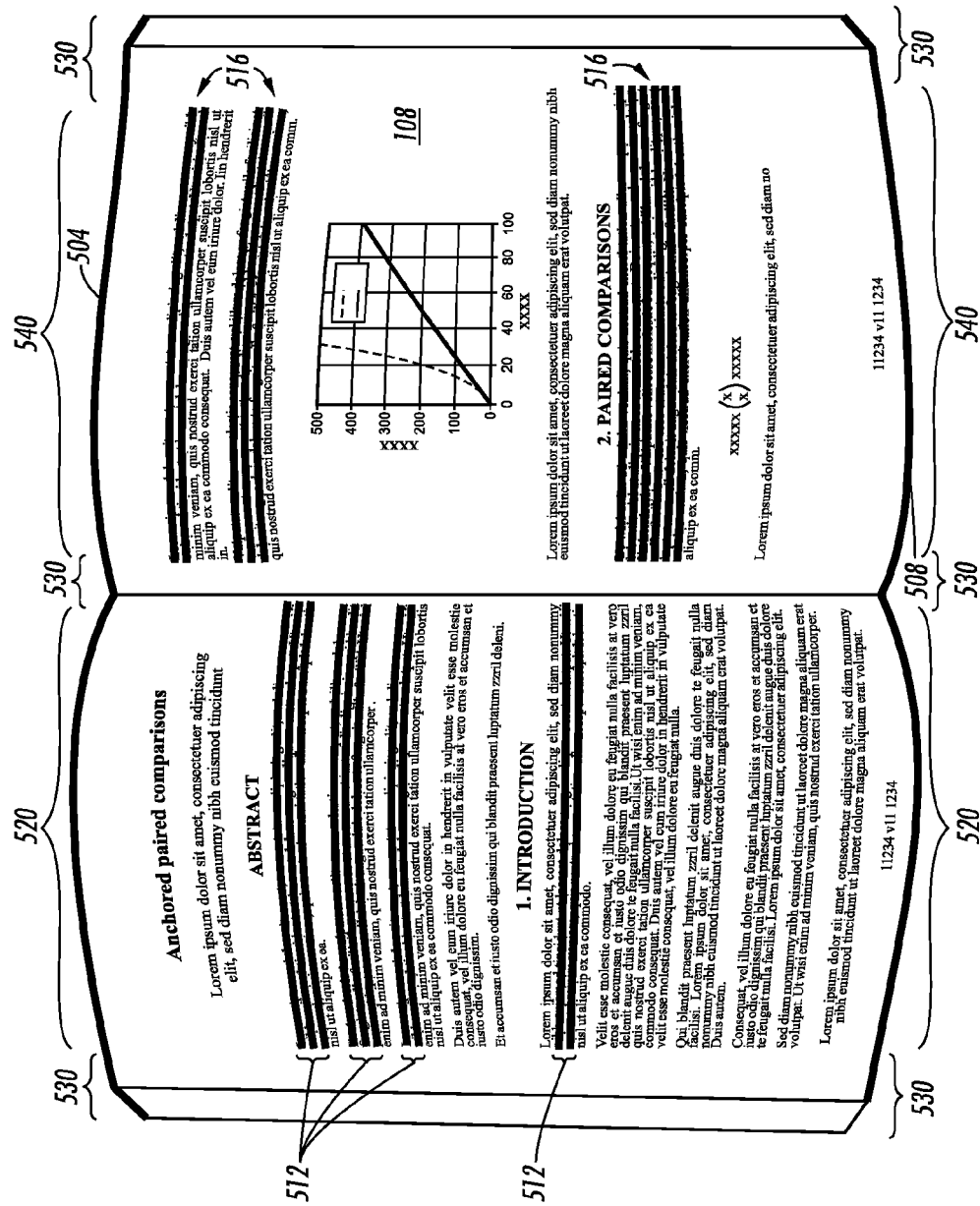
FIG. 5 depicts features associated with selected ones of the vectors of FIG. 4.

In the present illustrative application of the method 210, it is appropriate to work with the longest strings of valid data. Accordingly, the top and bottom edge vectors (404, 408) and the ten longest vectors associated with each cluster of valid data (412 and 416) are selected 222 for further processing. The associated portions of the image are illustrated in FIG. 5. The vectors illustrated at 404 and 408 are associated with top and bottom edges 504 and 508, respectively. The vectors selected from those illustrated at 412 are associated with lines of text or portions thereof identified at 512. Ten of the longest vectors illustrated at 416 are associated with the highlighted text 516 of the right page of the book 108.

In some embodiments or applications, selecting 222 vector portions having valid data at corresponding positions would include selecting only portions of the vectors associated with the top 504 and bottom 508 edges, applying 226 PCA to those vectors and interpolating based on the results of PCA to estimate distortion for positions in the second direction (e.g., y) between the top and bottom edges (504, 508). Alternatively, vector portions associated with two lines of text might be selected 222 or a vector portion associated with a line of text and a portion of a vector associated with one edge (e.g., 504) or the other (e.g., 508). In the case of the selection of page edges, or in the case of the availability of a vector including valid data regarding a line of text on a first page and valid data regarding a line of text on an adjacent page, the method 210 can be applied to generate a corrected version of the entire image at once.

In the illustrative example, the image is segmented into separate portions or areas of interest and processed accordingly. For example, portions of vectors associated with positions in the second direction associated with the positions of lines of text 512 from the left page of the book 108 as well as portions of vectors associated with the positions of portions 520 of the top 504 and bottom 508 edges of the pages are selected 222 for processing as a first area of interest.

Figure 6:
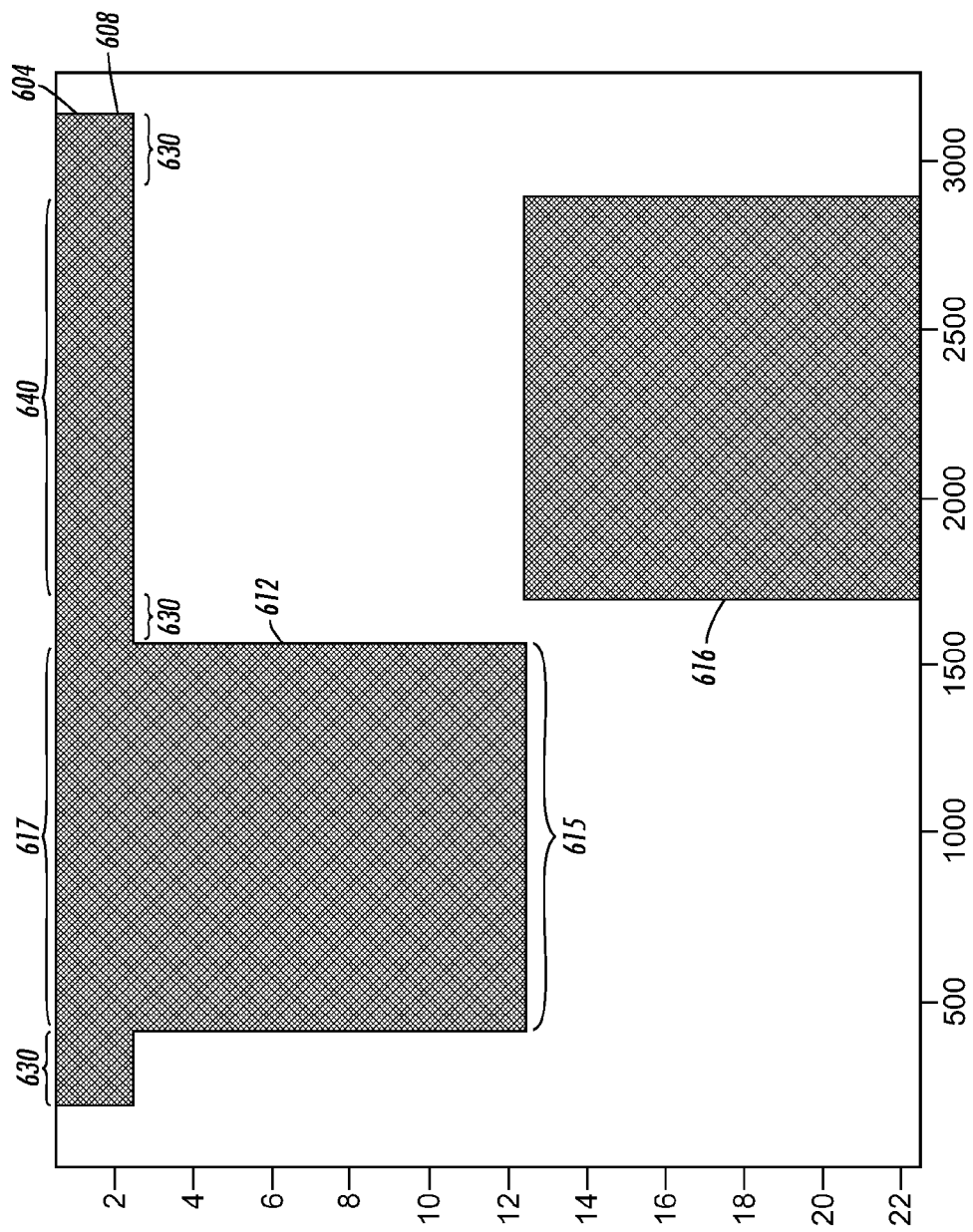
FIG. 6 illustrates regions of valid and invalid data in a selected subset of the vectors illustrated in FIG. 4.

FIG. 6 illustrates vector portions 604 and 608 associated with portions of the vectors illustrated at 404 and 408 for which both vectors (404, 408) include valid data. Portions 612 of selected ones of the vectors illustrated at 412 are also depicted. The portions 612 have valid data over a range 615 of positions in the first direction (e.g., x) corresponding to a portion 617 of the vector portions 604 and 608. That is, the portion 617 of vector portions 604 and 608 and vector portions 612 can be selected 222 as a first subset of the plurality of determined 218 vectors characterizing respective shapes or positions of the identified 214 features. The respective portions (e.g., 612, 617) include those portions of each vector in the first subset corresponding to selected positions in the first direction (e.g., 615), the selected positions being positions for which each respective vector in the first subset includes valid feature position information.

When only two vectors are selected 222, applying 226 principal component analysis (PCA) can reduce to subtracting the first vector from the second vector thereby determining at least one basis vector. An average vector can be determined by adding the first vector to the second vector and dividing that vector sum by the scalar 2. A first coefficient to be applied to the basis vector when estimating position information at the position in the second direction (e.g., y) associated with the first vector can be determined to have a value of $-\frac{1}{2}$. A coefficient to be applied to the basis vector for the purpose of determining an estimate for the positions of the feature associated with the second vector can be determined to have a value of $+\frac{1}{2}$.

When additional vectors associated with additional features are to be considered, such as in the illustrative embodiment, more traditional forms of PCA are applied 226.

According to principal component analysis, a set of vectors $Y_1, Y_2, \ldots Y_m$ can be approximated by a set of k bases $b_j$ and a corresponding set of coefficients $\alpha_{ij}$.

That is, given:

$$Y = \begin{bmatrix} y_{11} & y_{12} & \cdots & y_{1n} \\ y_{21} & y_{22} & \cdots & y_{2n} \\ \vdots & \vdots & \vdots & \vdots \\ y_{m1} & y_{m2} & \cdots & y_{mn} \end{bmatrix} = \begin{bmatrix} Y_1 \\ Y_2 \\ \vdots \\ Y_m \end{bmatrix}$$

according to PCA:

$$\hat{Y}_i = \bar{Y} + \sum_{j=1}^{k} \alpha_{ij} b_j,$$

where $\bar{Y}$ is the average column vector of matrix Y given by:

$$\bar{Y} = \frac{1}{m} \sum_{i=1}^{m} Y_i.$$

Errors due to the approximation process of PCA are defined according to:

$$e = Y - \hat{Y} = \begin{bmatrix} Y_1 \\ Y_2 \\ \vdots \\ Y_m \end{bmatrix} - \begin{bmatrix} \hat{Y}_1 \\ \hat{Y}_2 \\ \vdots \\ \hat{Y}_m \end{bmatrix}.$$

The process of PCA finds the $\alpha_{ij}$'s and $b_j$'s that minimize the magnitude of the error matrix e.

As applied here, each row vector $Y_i$ represents the positions in the second direction (e.g., y) of portions of a feature (e.g., the top edge, bottom edge or a line of text of pages of a book) sampled at positions in the first direction (e.g., x=1, 2, 3, ..., N). If there were no distortion or curvature, all the elements of $Y_i = [y_{i1}\ y_{i2} \ldots y_{in}]$ are equal to a constant. Accordingly, as used above, n represents the number of positions in the first direction sampled in each vector and m is the number of features, or vectors thereof, selected 222 for analysis. In any given application, the number of basis vectors ($b_j$) is limited to the number of feature vector portions used as input and may be as few as one, independent of the number of feature vectors $Y_i$ selected 222. An increase in the number of basis vectors $b_j$ reduces the error in the estimate at the expense of increased processing time and complexity.

Experimental results indicate that excellent image de-warping results can often be achieved with a single basis vector.

Once principal component analysis is applied 226 to the selected 222 vector portions, a first average vector, a first at least one respective basis vector and respective plurality of sets of at least one coefficient, are determined. Each respective set of at least one coefficient corresponds to the respective position in the second direction (e.g., $y_{ij}$) of an associated respective line-like feature portion (e.g., 512, 504, 508) or portion (e.g., 520) thereof, associated with a respective vector portion (e.g., 612, 617) included in the first subset of the plurality of vectors. As indicated above, a combination of the first at least one respective basis vector, a selected respective set of at least one first coefficient and the first average vector can provide an estimate of a position in the second direction for the respective line-like feature portion associated with the selective respective set of at least one first coefficient.

Once the application 226 of PCA is completed, interpolation and/or extrapolation 230 can include determining a first function describing a relationship of the respective first plurality of sets of at least one coefficient to position in the second direction (e.g., y). For instance, determining the first function can include determining a function for interpolation of coefficients at positions of interest that are between positions associated with respective pairs of the at least one coefficient determined according to the performance or application 226 of principal component analysis, based on the determined coefficients associated with positions adjacent given positions of interest. For instance, coefficients for positions between positions $y_1$ and $y_2$ can be determined by interpolating 230 between the coefficients associated with vector portion Y1 and vector portion Y2. For example, piecewise interpolation between positions of vectors adjacent a given position of interest can be performed. In some applications, piecewise linear interpolation is appropriate. For instance, polynomial interpolation can be performed. In many cases, a linear interpolation is appropriate.

As used here, in this regard, the word—function—can refer to one or more functions. For example, piecewise linear interpolation may result in a set of functions referred to herein collectively as a function. Additionally, where the form of PCA applied 226 finds more than one basis vector, each position associated with the input vectors to that process will be associated with a respective set of coefficients, one for each basis vector. In this regard, determining a function describing a relationship of the respective plurality of sets of at least one coefficient can refer to finding separate functions for the coefficients of each basis vector.

The purpose of the interpolation and/or extrapolation 230 is to generate an estimate for the curvature or distortion of the image at a relatively high resolution. Accordingly, the interpolation/extrapolation 230 includes determining a set of positions of interest in the second direction (e.g., y) for which an estimate of curvature or distortion is desired. Typically, an estimate will be desired for every row of pixels in the image. However, as will be explained in greater detail below, where resampling is appropriate or to be applied it may be determined that positions including interpixel positions are of interest.

Whichever positions are determined to be the positions of interest, the interpolation/extrapolation 230 includes calculating a set of at least one respective coefficient for the at least one respective basis vector according to the determined first function and the position in the second direction of each position of interest.

Once the coefficients (i.e., the $\alpha_{ij}$) are calculated, they can be used to determine a first set of positional estimates in the second direction. That is, for each position of interest in the second direction (e.g., y), a positional estimate can be determined for a hypothetical line-like feature intersecting that position and extending in the first direction (e.g., x). The first set of positional estimates includes an estimate for each position corresponding to the selected positions in the first direction for which the vector portions included in the first set of the plurality of vectors include valid feature information. The first set of positional estimates can be determined from a combination of the at least one respective first basis vector, the at least one calculated set of at least one respective coefficient corresponding to the position of interest in the second direction and the first average vector. That is, as indicated above, for each position of interest i, an estimate of where a line extending in the first direction (e.g., x) at position i in the second direction (e.g., y) would be depicted if it were included in the distorted image at positions in the first direction (e.g., x) corresponding to those first direction positions represented in the selected 222 vectors. In other words, $$\hat{Y}_i = \overline{Y} + \sum_{j=1}^{k} \alpha_{ij} b_j$$

can be used to determine the first set of positional estimates. For example, at pixel position y=50 a set of positional estimates might include 50, 50.1, 50.2, 50.3, 50.5, 50.7, 50.5, 50.4, 50.3, 50.1, 49.9, 49.7. Such a set of positional estimates indicates that a line that would otherwise extend in the x direction at y position 50, if distorted according to the distortion in the image being processed, would instead appear to go through positions x=1; y=50, x=2; y=50.1; x=3; y=50.2; x=4; y=50.3, . . . , x=12; y=49.7.

Such a set of positional estimates for each position of interest in the second direction (e.g., y) and sampled at each position in the first direction (e.g., x) corresponding to the positions in the first direction included in the selected 222 vectors is considered a de-warping map for the first area of interest. Such a de-warping map can be used to de-warp 234 the image data. For example, the positional estimate information is used in a resampling procedure wherein pixel data is retrieved from, or estimated for, the positions pointed to by the de-warp map and written to an associated target position in an output image. For instance, data is read from or estimated for pixel position x=3; y=50.1 in the input image and written to position x=3; y=50 in an output image. Image data is estimated for interpixel positions (e.g., 50.1) through subpixel sampling or interpolation. For example, to estimate a pixel value for position x=3; y=50.1, a weighted sum is determined using the data from x=3; y=50 and x=3; y=51 wherein, for example, since y position 50.1 is 90% of the way to y position 50, the data from x=3; y=50 is given a weight of 0.9 and since y position 50.1 is just 10% of the way to y position 51, a 10% weight is given to the pixel value associated with image position x=3; y=51.

As indicated above, the de-warped image can be stored 238 and/or rendered 248 (e.g., displayed or printed). Rendering 242 is most appropriate if the first area of interest encompasses the entire image. If instead, the first area of interest encompasses only a portion of the image (e.g., such as the left hand text region between edge portions 520 depicted in FIG. 5, it may be more appropriate to store 238 the de-warped image or to delay de-warping 234 until a more complete de-warp map is assembled from a plurality of similarly generated de-warp maps associated with second, third or more areas of interest defined by other sets of selected 222 vector portions.

For example, as indicated above, the exemplary image of facing pages of an open book can be processed as separate regions or areas of interest defined by the available line-like features. For instance, the inner and outer margins 530 of open book 108 including, in some instances, portions of the edges of pages behind the clearly visible pages, can be considered to comprise a second area of interest defined by portions 530 of the top and bottom edges 504, 508 of the facing pages of open book 108 and associated with selected 222 vector portions 630 of top and bottom edge vectors 604 and 608 depicted in FIG. 6.

A third illustrative area of interest (or an alternate second area of interest) can be considered to be defined by right page text portions of top and bottom edges 504 and 508 and the selected 222 lines of text 516 associated with vector portions 640 and selected vectors 616 depicted in FIG. 6.

As depicted in FIG. 2, the selection 222 of vectors, application 226 of PCA and interpolation and/or extrapolation 230 can be repeated for additional areas of interest according to a trade off of desired de-warping accuracy and tolerable processing time. Where speed is important, it may be desirable to de-warp 234 based on an extrapolation 230 of the information provided by the analysis of only a single area of interest. Where the arrangement of features in an image and a desire for improved de-warping requires, a second and/or additional subset of the plurality of vectors is selected 222 and a respective second or additional de-warping map is generated. The second or additional de-warping map is then stitched or concatenated to the first and/or other de-warping maps. In some embodiments, the de-warping map concatenation is facilitated by the judicious determination of second or additional sets of positions of interest during or in preparation for the interpolation and/or extrapolation 230 associated with the second or additional areas of interest.

For example, a de-warping map for the inner and outer margins defined by edge portions 530 can be generated by selecting 222 margin vector portions 630 of top and bottom edge vectors 604 and 608 and applying 226 principal component analysis to these margin vector portions 630. Principal component analysis is then performed on this second subset of the plurality of vectors (see FIG. 4) thereby determining a second average vector, a second at least one respective basis vector and a respective second plurality of sets of at least one coefficient, each respective set of at least one coefficient corresponding to the respective position in the second direction of an associated respective line-like feature portion corresponding to the respective vector portion included in the second subset of the plurality of vectors (e.g., the positions in the y direction of a reference point on each of top 504 and bottom edges 508 included in edge portions 530). The respective second plurality of sets of at least one coefficient being such that a combination of the second at least one respective basis vector, a selected respective set of at least one second coefficient from the respective second plurality of sets of at least one coefficient and the second average vector provide an estimate of position in the second direction for the respective line-like feature portion associated with the selected set of at least one second coefficient.

A second function describing a relationship of the respective second plurality of sets of at least one second coefficient to position in the second direction is determined, as is a second set of positions of interest in the second direction.

As indicated above, careful selection of the second set of positions of interest in the second direction can help provide a smooth transition between a de-warp map associated with the first area of interest and a de-warp map associated with this second or additional area of interest. In such embodiments, determining the second set of positions of interest in the second direction can include selecting respective positions in the second direction associated with positional estimates of the first (or other) set of positional estimates. For instance, the selected respective positions can be those positions in the second direction associated with positions in the first direction that are closest, from among the positions in the first direction associated with the positional estimates of the first (or other) set of positional estimates, to positions in the first direction associated with a selected set of ends of vector portions included in the second (or other) subset of the plurality of vectors.

Figure 7:
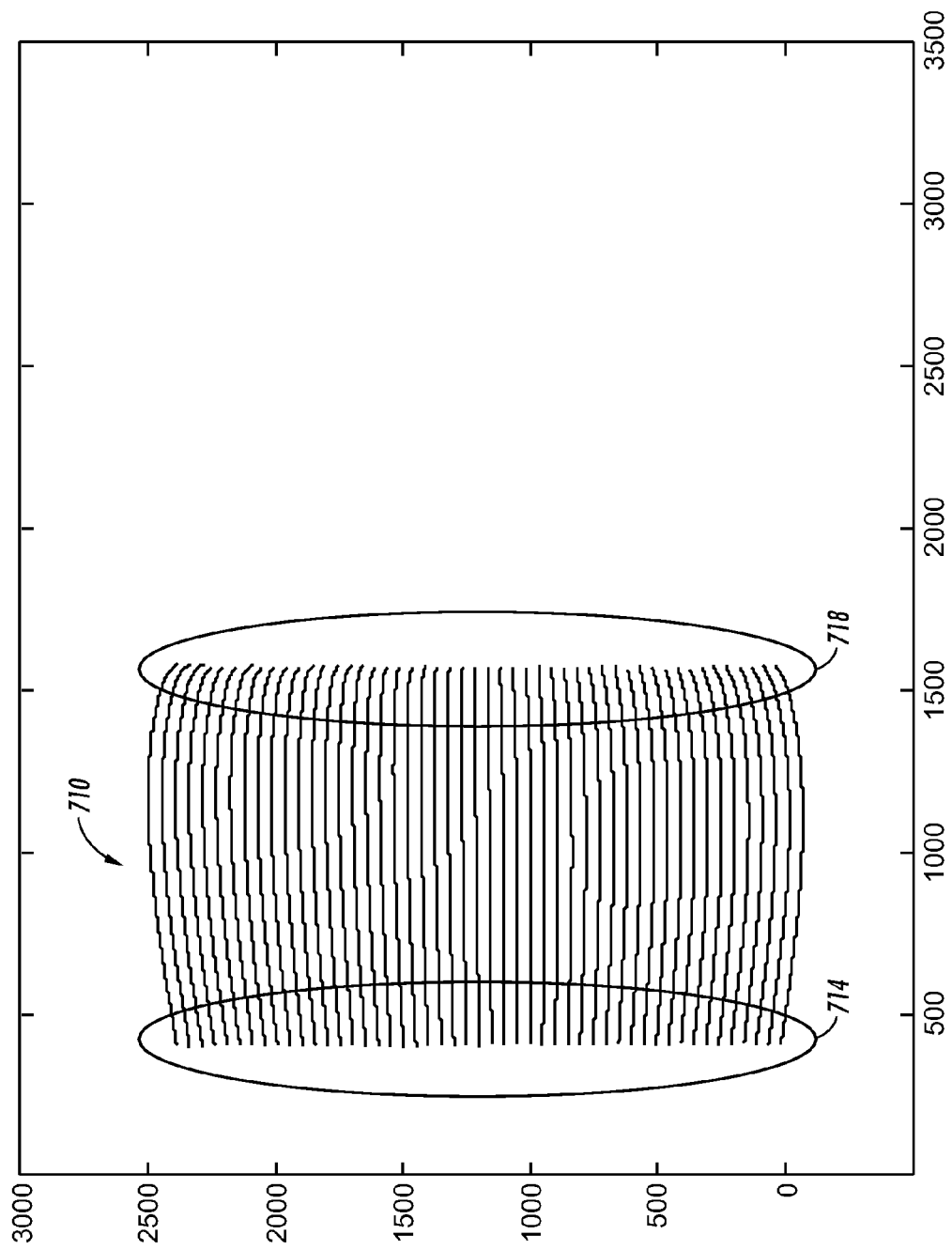
FIG. 7-FIG. 10 illustrate stages in the creation of an illustrative de-warp map for generating a compensated version of the image of FIG. 1.

For example, referring to FIG. 7, a first set of positional estimates or de-warping curve 710 includes a set of vectors which provide estimates of the apparent position of some supposed or hypothetical line-like features that might intersect some reference point included in the vectors. Each vector includes a first end or element 714 and a second or last end or element 718. As with every other element in each vector, the end elements 714, 718 point to a position of a portion of the hypothetical line-like element in the second direction (e.g., y) at a respective position in the first direction (e.g., x). A smooth transition to a mating de-warping map will be made if respective adjacent elements of the respective maps point to the same position in the second direction.

Accordingly, in some embodiments or applications, as indicated above, determining the second set of positions of interest in the second direction can include selecting those positions pointed to by the end elements of vectors of a previously determined de-warping map segment (e.g. 710). That is, if a second area of interest is on the left side of a first area of interest, then it can be beneficial to select as a second set of positions of interest in the second direction those positions in the second direction pointed to by the elements representing the left-most position addressed in the first de-warping map (e.g., 714).

If the second area of interest is on the right side of the first area of interest, then selecting as the second set of positions of interest those positions pointed to by the elements of the first de-warping map segment that addressed the right-most (e.g., 718) portion of the first area of interest can be beneficial.

In the illustrative example, the second area of interest includes both inner and outer margins, which bracket the first area of interest. In this case, the second set of positions of interest can be determined to be those positions pointed to by the elements of either end (714 or 718) of the first de-warping map segment 710. In the illustrative example, those positions pointed to by the left-most portion of the de-warping map are selected and it is assumed that any discontinuities between the first and second de-warping maps at the right side of the first de-warping map segment 710 will be unimportant.

However, if it is determined that such discontinuities at the inner margin are intolerable, then the image can be reprocessed with the right side elements 718 of the first de-warping map segment 710 selected or determined to be the elements of the second set of positions of interest in the second direction.

If this selection also leads to undesirable artifacts in the de-warped image, then the second area of interest can be broken down into further subareas of interest and each one treated individually. For example, the second area of interest 530 can be broken down into a left margin, central margin and right margin areas of interest. Furthermore, the central margin area can be further broken down into a left page right margin and right page left margin areas of interest.

Once the second set of positions of interest in the second direction is determined, a second plurality of sets of at least one respective coefficient for the at least one respective second basis vector can be calculated by interpolation/extrapolation 230 according to the determined second function and the positions in the second direction of the positions of interest.

Then, for each position of interest in the second direction in the second set of positions of interest, a second set of position estimates in the second direction can be determined. The second set of position estimates can include an estimate, for each position corresponding to the selected positions in the first direction for which the vector portions included in the second subset of the plurality of vectors include valid feature position information, the second set of positional estimates can be determined from a combination of the at least one second basis vector, the second plurality of sets of at least one respective coefficient corresponding to the positions of interest in the second direction and the second average vector.

Figure 8:
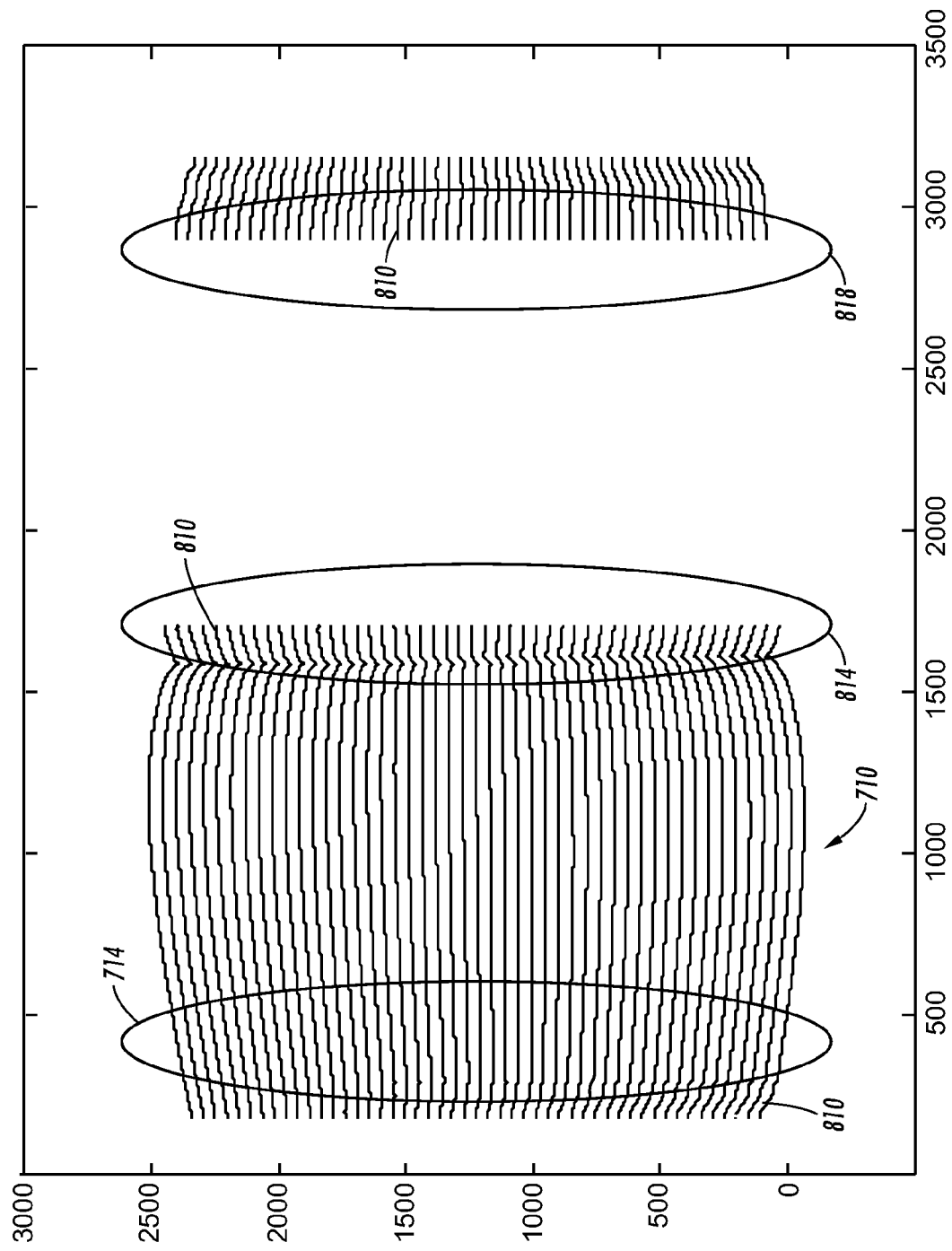

Referring to FIG. 8, this results in a second de-warping map or map segment 810 that is concatenated smoothly to the first de-warping map segment 710.

A similar process can be repeated for a third area of interest such as a third area of interest including lines of text 516 on the right page of the open book image 108 and related page edge portions 540. In this instance, the selected 222 vector portions can include vector portions 616 representing line-like features extracted from the lines of text 516 and top and bottom edge vector (604, 608) portions 640 associated with top and bottom edge portions 540. Principal component analysis is applied 226 to the selected 222 vectors and a third average vector, a third at least one respective basis vector and a respective third plurality of sets of at least one coefficient are thereby determined. A third function describing a relationship of the respective third plurality of sets of at least one third coefficient to position in the second direction and a third set of positions of interest in the second direction is also determined. Since, in the illustrative application the third area of interest is adjacent to or surrounded by parts of the second area of interest, there will be transition between portions of the second de-warping map segment and a third de-warping map segment to be generated by the analysis 226 and interpolation/extrapolation 230 associated with this third selected 222 set of vector portions. A smooth transition can be made between at least portions of the second 810 and third de-warping map segments if the third set of positions of interest in the second direction is determined to include positions in the second direction pointed to by elements of the second de-warping map segment related to positions in the first direction (e.g., x) that are closest to positions in the first direction associated with elements of the selected 222 third set of vectors.

In the illustrated application, the third map segment will fill a gap between two portions 814 and 818 of the second map segment 810. A choice can be made to ensure the smoothest transition between map segments at either point (814, 818) and as indicated above, if the results of that choice are undesirable, the alternate choice can be made or other segmentations can be applied. In the illustrative application, the choice is made to select positions pointed to by second de-warping map elements associated with the position in the first direction (e.g., x) associated with the right-most portion of the inner margin of the right page (e.g., 814). Accordingly, the third set of positions of interest in the second direction is determined to include those points in the second direction pointed to by elements of the second de-warp map segment 810 associated with the position in the first direction associated with the right-most portion of the inner margin of the right page.

Figure 9:
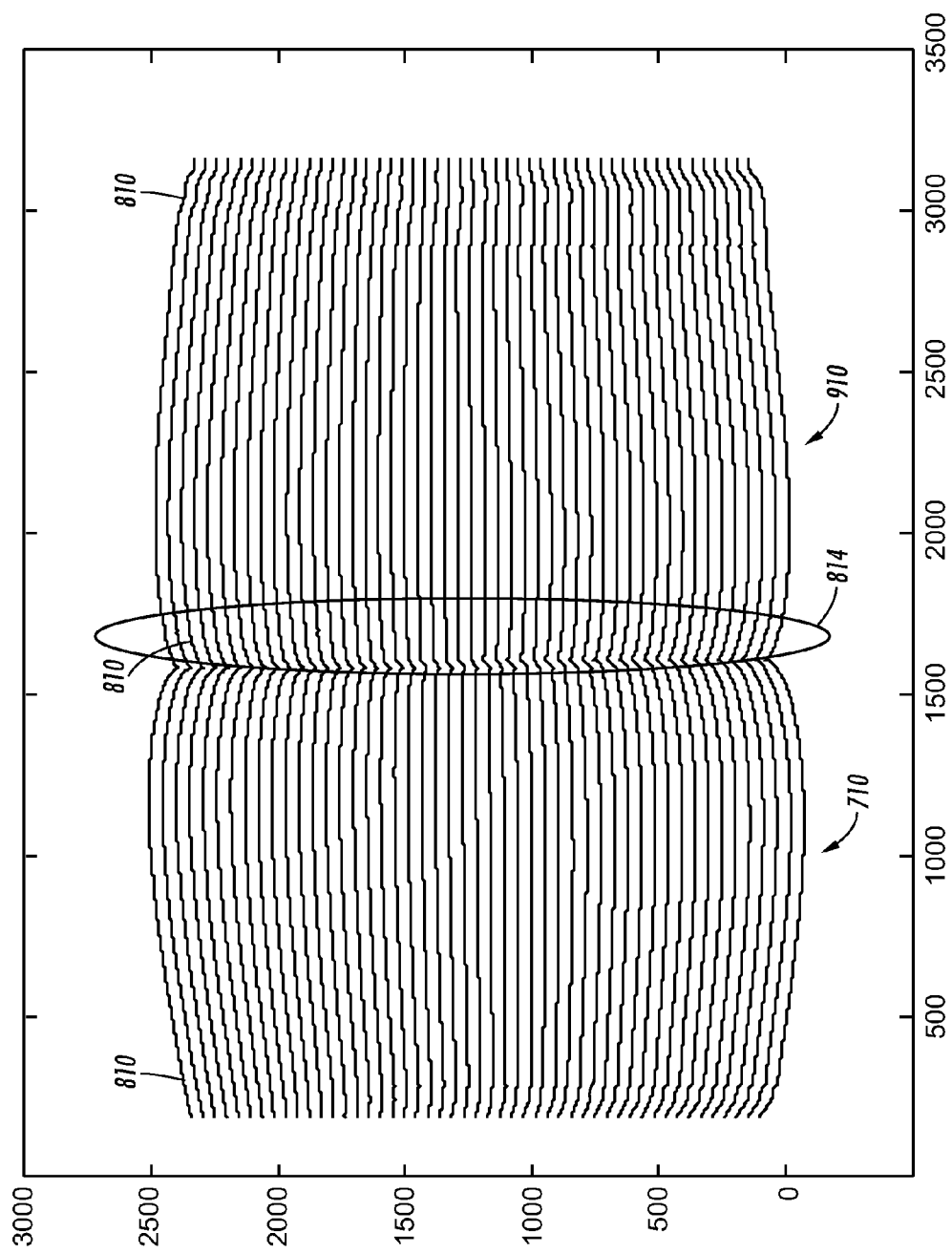
Figure 10:
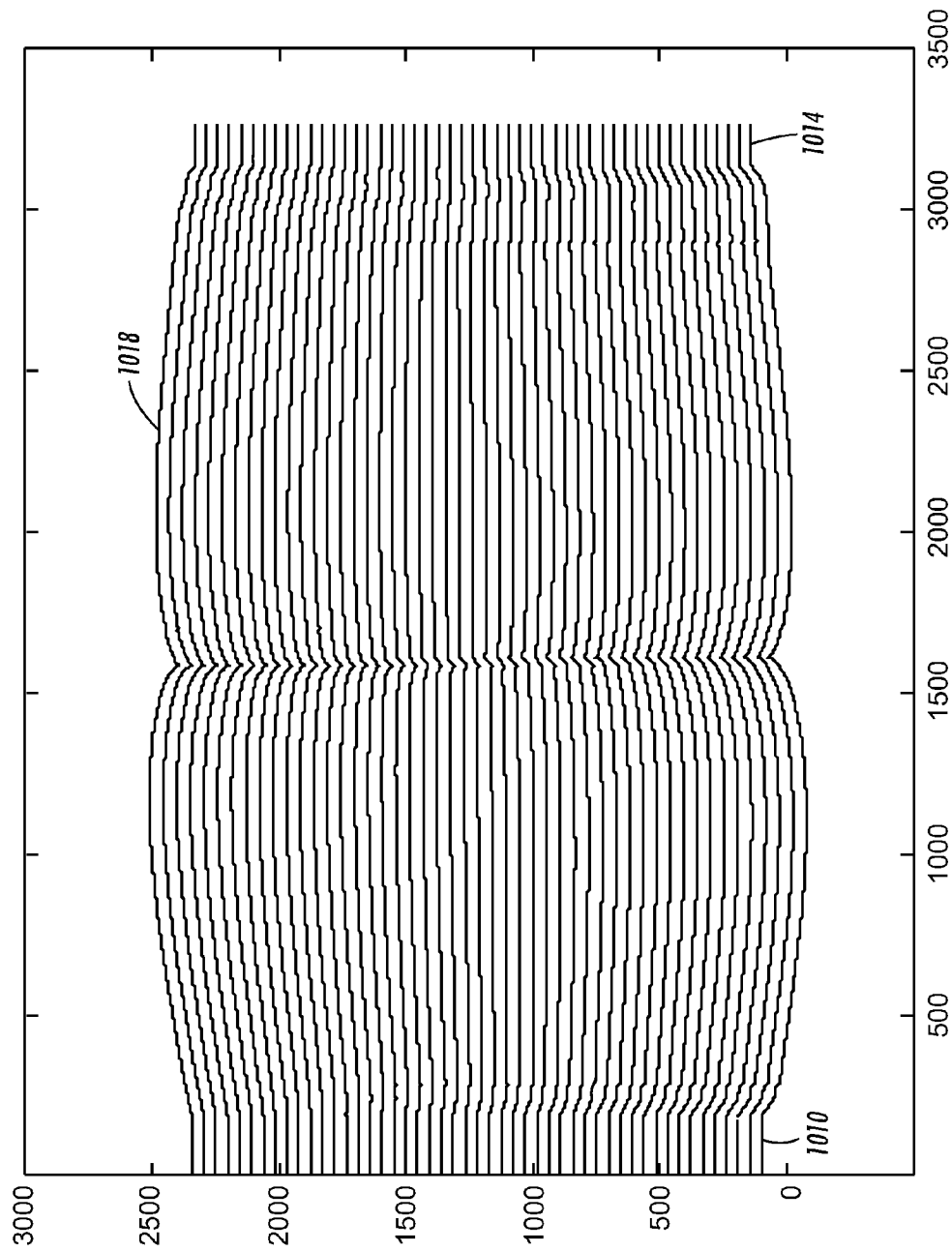

FIG. 9 depicts the third de-warping map segment concatenated to the second de-warping map segment 810 and in relation to the first de-warping map segment 710. Further extrapolation can be applied to allow for smooth transitions with portions of the image not associated with useful line-like features such as, for example, background portions of an image or margins of a page. For example, as depicted in FIG. 10, for regions 1010 and 1014 beyond the left and right portions of the second area of interest, the values of de-warping map elements are assumed to be the same and to be equal to the value of the closest de-warping map elements. Other forms of extrapolation are possible and contemplated.

Figure 1:
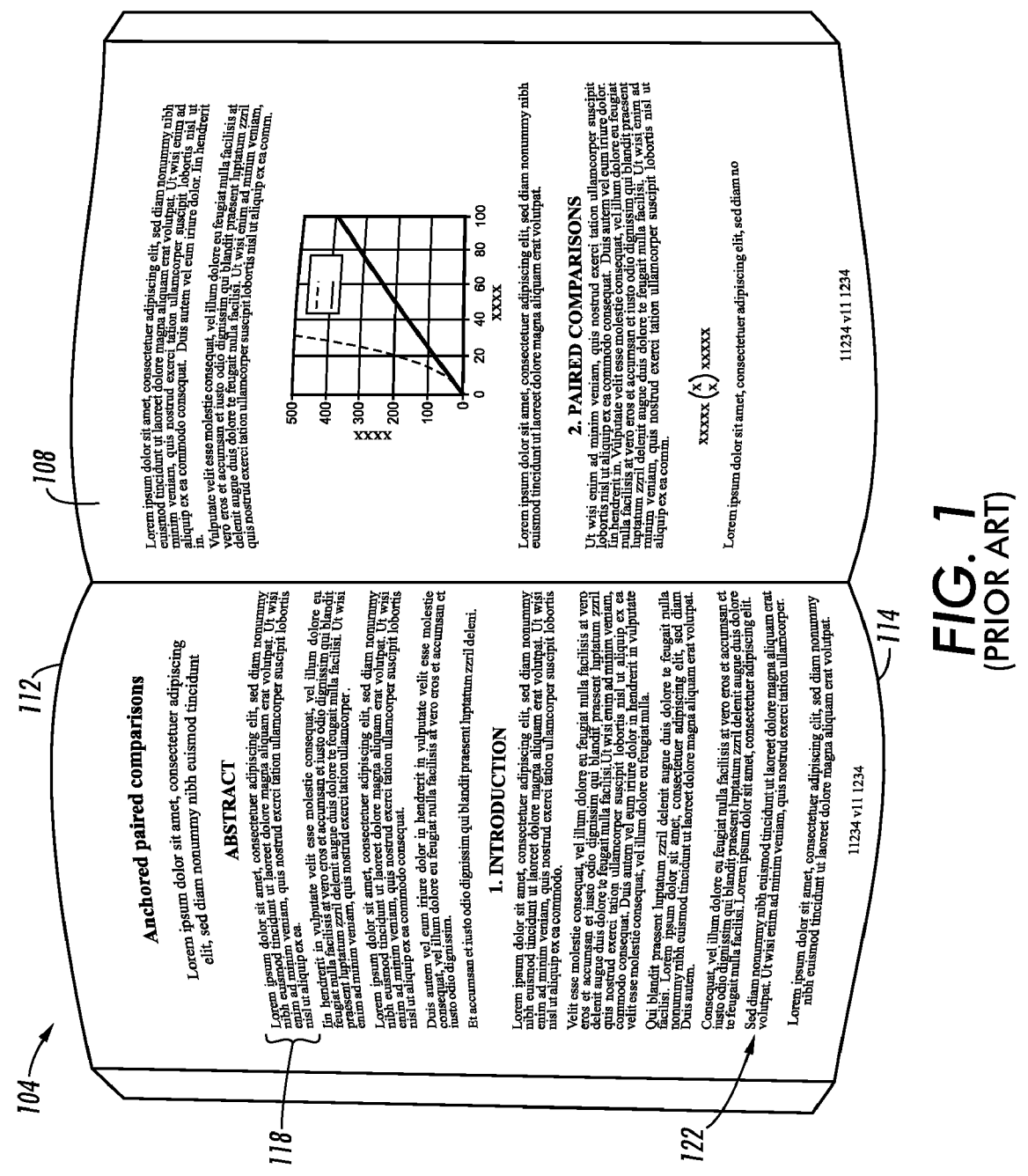
Figure 12:
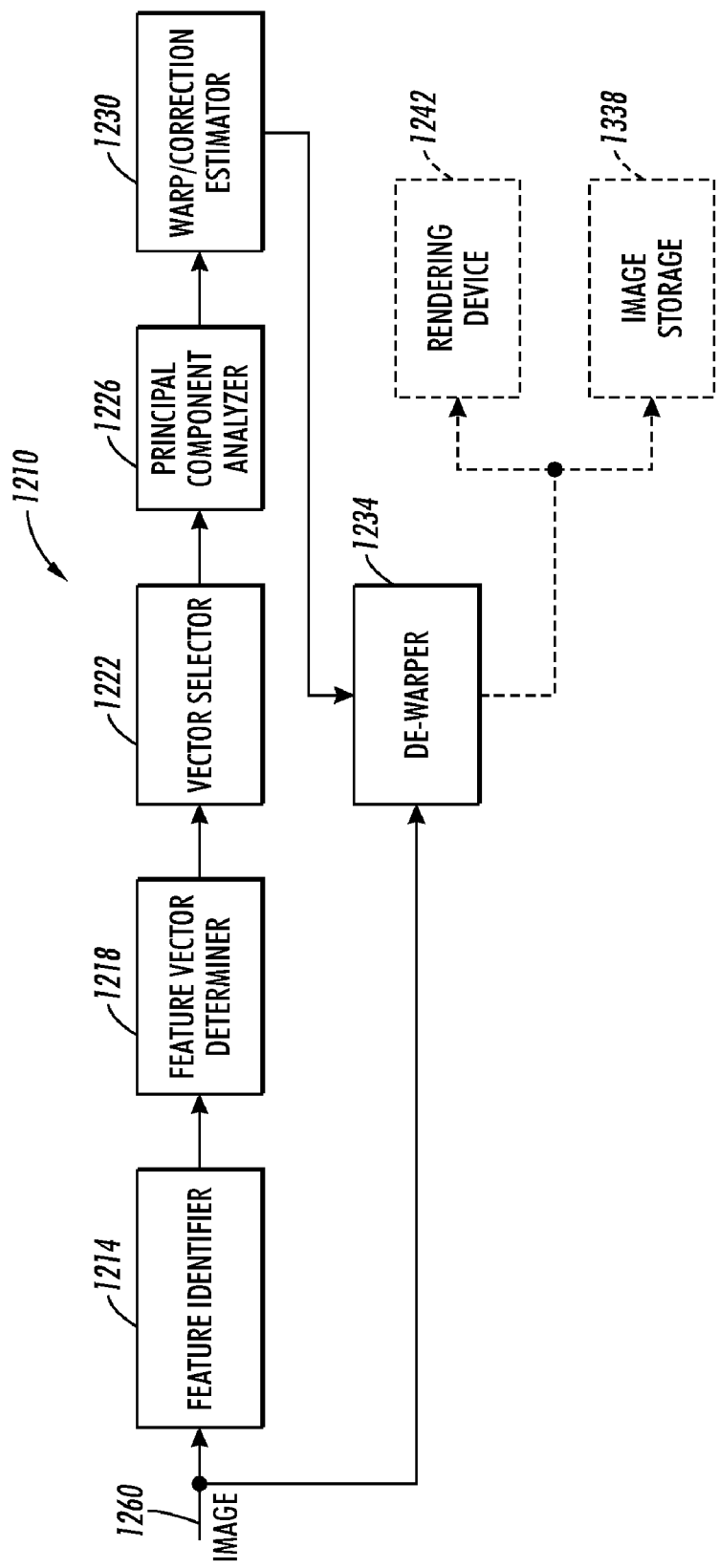
FIG. 12 is a block diagram of a system operative to perform embodiments of the method of FIG. 2.

As indicated above, de-warping 234 can be accomplished using a final de-warping map, e.g., 1018, by a number of techniques. For example, original input image (e.g., FIG. 1) pixels can be resampled and/or relocated according to the positions pointed to by the de-warping map 1018 and relocated according to the reference positions associated with the respective de-warping map vectors. FIG. 12 illustrates the results of such a de-warping applied to the image of FIG. 1.

Since it is likely that when a next page of a given book is imaged it will be warped in a manner very similar to the warping that occurred in the previous page, when necessary, due to, for example, a lack of line-like features in a page including, for example, only photographic or curved graphic elements, a de-warping map generated for a previous page or set of pages can be applied to a next or subsequent page.

Referring to FIG. 12, an image processor 1210 that is operative to perform embodiments of the method 210 can include a feature identifier 1214, a feature vector determiner 1218, a vector selector 1222, a principal component analyzer 1226, a warp or correction estimator 1230 and a de-warper 4334 1234. The image processor 1210 may be associated with one or both of an image storage device 1238 and a rendering device 1242. Each of these elements or modules can be implemented as hardware, software or combinations thereof. For example, each element (1214-1234) can be implemented as software loaded into a computer memory (e.g., RAM, ROM) in communication with a computational element such as a microprocessor, microcontroller, digital signal processor, microcomputer, or other computational element. The computational element can be in communication with additional memory for the storage of and manipulation of data and results. The software includes instructions for controlling the operation of the computational element. Additionally or alternatively, aspects of the various modules (1214-1234) can be implemented in hardware devices such as application specific integrated circuits and field programmable gate arrays. Additionally, or alternatively, elements can be implemented in, and distributed over, a network.

The feature identifier 1214 is operative to identify 214 a plurality of respective line-like features of an object (e.g., 108) included in an image (see FIG. 1), the plurality of line-like features extending in a first direction (e.g., x) and being located at respective separate positions in a second direction (e.g., y) that is orthogonal to the first direction, each respective line-like feature having a curvature that is representative of a curvature of the image at the respective position (e.g., 304, 308, 312, 316). The feature identifier makes identification information regarding the identified plurality of respective line-like features available to the feature vector determiner 1218.

The feature vector determiner 1218 is operative to determine 218 a plurality of respective vectors representing points in the image defined by each respective line-like feature of the plurality of respective line-like features. Accordingly, each vector of the plurality of respective vectors characterizes the curvature of the image at respective positions in the second direction of the respective line-like feature. That is, for selected positions in the first direction, each respective vector includes a corresponding position of the respective line-like feature in the second direction. The feature vector determiner makes the determined plurality of respective vectors available to the vector selector 1322 1222.

The vector selector 1222 is operative to select at least one respective subset of the plurality of vectors, the at least one respective subset including at least respective portions of selected vectors of the plurality of vectors. The respective portions include those portions of each vector in the at least one respective subset corresponding to selected positions in the first direction. The selected positions being those positions for which each respective vector in the at least one respective subset includes valid feature position information. Each of the at least one respective subset of the plurality of vectors can be considered to define a respective area of interest. The vector selector 1322 can make the selected 222 vectors available to the principal component analyzer 1226.

The number of subsets of vectors selected 222 by the vector selector 1222 is a function of the number of and location of line-like features identified 214 by the feature identifier 1214 and can be influenced by software configuration and/or input from an image processor operator. For example, some images may be corrected based on only two vectors, such as top and bottom page edge vectors (e.g., 504, 508, 604, 608) or aligned lines of text on facing pages of an image object included in the image such as, for example, aligned first lines on each page and aligned last lines on each page or lines located close thereto. In such instances, only one plurality of vectors is selected 222 and only two vectors are included in that plurality. As indicated above, in some instances, only portions of feature vectors are included in the selected vectors. In some instances, an image is segmented into various regions and the vector selector 1222 selects 222 a respective plurality of vectors for each region or area of interest, as discussed above with regard to FIG. 2 - FIG. 6.

The principal component analyzer 1226 is operative to perform or apply 226 principal component analysis on or to the at least one respective subset of the plurality of vectors selected 222 by the vector selector 1222. This application 226 of PCA determines at least one respective average vector, at least one respective set of at least one basis vector and respective pluralities of sets of at least one coefficient. Each respective set of at least one coefficient corresponds to the respective position in the second direction (e.g., y) of an associated respective line-like feature portion. The respective line-like feature portion corresponds to or is represented by a respective vector portion included in the respective at least one subset of the plurality of vectors. As explained above, the result of PCA provides a method of estimating the position of object features. That is, the combination of the respective set of at least one respective basis vector, a selected respective set of at least one respective coefficient and the respective average vector provide an estimate of positions in the second direction for the respective line-like feature portion associated with the selected respective set of at least one respective coefficient.

The warp or correction estimator 1230 receives the results of the application 226 of PCA from the principal component analyzer 1226 and generates estimates of warp, distortion or correction values for many more positions in the object or image than are provided by the results of the application 226 of PCA alone. The warp or correction estimator 1230 generates these estimates by interpolation and/or extrapolation 230. For instance, the correction estimator 1230 is operative to determine at least one respective function describing respective relationships of the respective pluralities of respective sets of at least one coefficient to position in the second direction. For each position of interest in the respective sets of positions of interest in the second direction, the correction estimator is operative to calculate respective sets of at least one respective coefficient for the respective at least one respective basis vector according to the determined at least one respective function and the position in the second direction of the position of interest. Additionally, the correction estimator 1230 is operative to determine for each position of interest in the second direction in a respective set of positions of interest, a respective set of position estimates in the second direction. The respective set of position estimates includes an estimate for each position corresponding to the selected positions in the first direction for which the vector positions included in the respective subset of the plurality of vectors include valid feature position information.

That is, for example, the correction estimator 1230 generates estimates at each x position represented in the selected 222 vector portions for each position of interest in the second direction (e.g.,y) determined to be of interest by the correction estimator 1230. The correction estimator 1230 determines these respective position estimates from a combination of the respective at least one respective basis vector, the at least one calculated respective set of at least one respective coefficient corresponding to the position of interest in the second direction and the respective average vector determined by the principal component analyzer 1226.

The image de-warper 1234 is operative to de-warp 234 image data associated with the image according to the respective sets of position estimates. This de-warping generates a compensated version of the image with unwanted curvature compensated for to at least some extent or removed entirely. For example, the input image data is resampled according to the positional estimates and written to locations associated with assumed intended positions of respective line-like features, both real and hypothetical, of the image data.

The image storage device 1238, if included, is operative to store the compensated version of the image data. For example, if the image data is not of the whole image, then the image data can be stored in anticipation of being combined with image data (compensated or uncompensated) associated with other regions of the image. Alternatively, the image storage device 1338 can store compensated image data until such time as the image data is needed for further image processing purposes including, but not limited to, image rendering 242 (e.g., display and/or printing).

The rendering device 1242 can be any known or yet to be developed rendering device such as a CRT display, plasma display, LCD display, electrophotographic printer, ink jet printer, electric paper, and xerographic printer.

In embodiments that allow an image to be analyzed as separate regions or areas of interest, e.g., where the vector selector 1222 is operative to select 222 a plurality of respective subsets of the plurality of vectors and wherein the principal component analyzer 1226 is operative to perform principal component analysis separately on these respective subsets of the plurality of vectors, the correction estimator 1230 can be operative to determine a first set of positions of interest for determining a first set of position estimates based on a first subset of the plurality of vectors and to determine a second set of positions of interest for determining a second set of position estimates based on a second subset of the plurality of vectors. One way to achieve a smooth transition between the de-warping maps or position estimates generated in separate applications of interpolation and/or extrapolation 230 applied to data associated with these separate areas of interest is for the second set of positions of interest determined by the correction estimator 1330 to include positions pointed to by adjacent end elements (e.g., 714 or 718) of sets of positional estimates determined for the first set of positions of interest.

Accordingly, the correction estimator 1230 can be operative to determine the second set of positions of interest in the second direction by selecting respective positions in the second direction associated with positional estimates of the first set of positional estimates, the selected respective positions being those positions in the second direction associated with positions in the first direction that are closest, from among the positions in the first direction associated with the positional estimates of the first set of positional estimates, to positions in the first direction associated with a selected set of ends of vector portions included in the second subset of the plurality of vectors. The correction estimator 1330 can then be further operative to determine the second set of positions of interest to be, or include, the selected respective positions.

The fastest de-warping or image correction occurs when a minimum number of areas of interest and a minimum number of vectors are selected 222 and processed. Additionally, experiments indicate that excellent results can often be achieved when an image is de-warped according to information provided by only two vectors representing line-like features located near the top and near the bottom of an object of interest in the image. For example, excellent results are usually achieved when vectors describing the edges of pages of an open book, lines of text near the top and near the bottom of such pages and/or combinations thereof are used to describe the curvature of the book and are relied upon to generate de-warping maps for entire images.

Accordingly, in some embodiments or applications, the vector selector 1222 is operative to select a first subset of the plurality of vectors by selecting only a first vector associated with a first end of the object and a second vector associated with a second end of the object. In such instances, the principal component analyzer 1226 can be operative to perform principal component analysis by subtracting the first vector from the second vector, thereby determining the at least one basis vector, determining a first coefficient for the basis vector associated with a position in the second direction associated with the first vector to have a value of $-\frac{1}{2}$ and determining a second coefficient for the basis vector and associated with a position in the second direction associated with the second vector and have a value of $+\frac{1}{2}$. The principal component analyzer can be further operative to determine an average vector by dividing a sum of the first vector and the second vector by 2. The reduction to this special case method of applying 226 PCA when only two vectors are being considered can enhance or increase image processing speed.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The word "printer" or "rendering device" as used herein encompasses any apparatus, such as a digital copier, book making machine, facsimile machine, multi-function machine, ATC. which performs a print outputting function for any purpose. Embodiments can be applied to image data describing monochrome and/or color image data.

The invention claimed is:

1. A method of processing image data of an image of an object to remove or compensate for unwanted curvature, the method comprising:

identifying, in the image, a plurality of respective line-like features of the object, the plurality of line-like features extending in a first direction and being located at respective separate positions in a second direction that is orthogonal to the first direction, each respective line-like feature having a curvature that is representative of a curvature of the image at the respective position;

determining a plurality of respective vectors representing points in the image defined by each respective line-like feature of the plurality of respective line-like features, wherein each vector of the plurality of respective vectors characterizes the curvature of the image at the respective position in the second direction of the respective line-like feature and wherein for selected positions in the first direction each respective vector includes a corresponding position of the respective line-like feature in the second direction;

selecting a first subset of the plurality of vectors, the first subset including at least portions of selected vectors of the plurality of vectors, the respective portions including those portions of each vector in the first subset corresponding to selected positions in the first direction, the selected positions being positions for which each respective vector in the first subset includes valid feature position information and defining a first area of interest;

performing principal component analysis on the first subset of the plurality of vectors, thereby determining a first average vector, a first at least one respective basis vector and a respective first plurality of sets of at least one coefficient, each respective set of at least one coefficient corresponding to the respective position in the second direction of an associated respective line-like feature portion corresponding to a respective vector portion included in the first subset of the plurality of vectors, a combination of the first at least one respective basis vector, a selected respective set of at least one first coefficient and the first average vector providing an estimate of positions in the second direction for the respective line-like feature portion associated with the selected respective set of at least one first coefficient;

determining a first function describing a relationship of the respective first plurality of sets of at least one coefficient to position in the second direction;

determining a first set of positions of interest in the second direction;

for each position of interest in the first set of positions of interest in the second direction:

calculating a first set of at least one respective coefficient for the at least one respective first basis vector according to the determined first function and the position in the second direction of the position of interest;

determining, for each position of interest in the second direction in the first set of positions of interest, a first set of position estimates in the second direction, the first set of position estimates including an estimate, for each position corresponding to the selected positions in the first direction for which the vector portions included in the first subset of the plurality of vectors include valid feature position information, from a combination of the at least one respective first basis vector, the at least one calculated first set of at least one respective coefficient corresponding to the position of interest in the second direction and the first average vector;

de-warping the image data associated with the first area of interest according to the respective estimated first sets of positional estimates, thereby generating a compensated version of the at least the first area of interest with the unwanted curvature compensated for or removed; and storing or rendering the compensated version of the first area of interest.

2. The method of claim 1 wherein identifying, in the image, the plurality of line-like features of the object comprises identifying at least a portion of a first edge of at least one page of an open book object included in the image and identifying at least a portion of a second edge of the at least one page of the open book object included in the image, the at least a portion of the second edge being of an edge opposite the first edge.

3. The method of claim 1 wherein identifying, in the image, the plurality of line-like features of the object comprises identifying respective first edges or lines of text of a pair of respective facing pages of an open book object included in the image and identifying respective last edges or lines text of the pair of respective facing pages of the open book object included in the image.

4. The method of claim 1 wherein determining the first function describing the relationship of the respective first plurality of sets of at least one coefficient to position in the second direction comprises at least one of:

determining a function for interpolation of coefficients at positions of interest that are between positions associated with respective pairs of sets of the at least one coefficient determined according to the performance of principal component analysis, based on the determined coefficients associated with the adjacent positions; and determining a function for extrapolation of the relationship of the respective plurality of sets of at least one coefficient to position in the second direction within the first area of interest to positions beyond the first area of interest.

5. The method of claim 1 comprising:

selecting a second subset of the plurality of vectors, the second subset including at least portions of selected vectors of the plurality of vectors, the respective second portions including those portions of each vector in the second subset corresponding to a second set of selected positions in the first direction, the second set of selected positions in the first direction being positions for which each respective vector included in the second subset includes valid feature position information and defining a second area of interest;

performing principal component analysis on the second subset of the plurality of vectors, thereby determining a second average vector, a second at least one respective basis vector and a respective second plurality of sets of at least one coefficient, each second respective set of at least one coefficient corresponding to the respective position in the second direction of an associated respective line-like feature portion corresponding to a respective vector portion included in the second subset of the plurality of vectors, a combination of the second at least one respective basis vector, a selected second respective set of at least one coefficient and the second average vector providing an estimate of positions in the second direction for the respective line-like feature portion associated with the selected second respective set of at least one coefficient;

determining a second function describing a relationship of the second respective plurality of sets of at least one coefficient to position in the second direction;

determining a second set of positions of interest in the second direction;

for each position of interest in the second set of positions of interest in the second direction:

calculating a second set of at least one respective coefficient for the at least one respective second basis vector according to the determined second function and the position in the second direction of the position of interest;

determining, for each of the positions of interest in the second direction in the second set of positions of interest, a second set of position estimates in the second direction, the second set of position estimates including an estimate for each position corresponding to the second set of selected positions in the first direction for which the vector portions included in the second subset of the plurality of vectors include valid feature position information, from a combination of the at least one second respective basis vector, the at least one calculated second set of at least one respective coefficient corresponding to the position of interest in the second direction and the second average vector;

de-warping the image data associated with the second area of interest according to the estimated second set of position estimates, thereby generating a compensated version of the at least the second area of interest; and storing or rendering the compensated version of the second area of interest.

6. The method of claim 5 wherein determining the second set of positions of interest in the second direction comprises:

selecting respective positions in the second direction associated with positional estimates of the first set of positional estimates, the selected respective positions being those positions in the second direction associated with positions in the first direction that are closest, from among the positions in the first direction associated with the positional estimates of the first set of positional estimates, to positions in the first direction associated with a selected set of ends of vector portions included in the second subset of the plurality of vectors; and determining the second set of positions of interest to be the selected respective positions.

7. The method of claim 1 wherein selecting the first subset of the plurality of vectors includes selecting only a first vector associated with a first edge and a second vector associated with a second edge and where performing principal component analysis comprises:

subtracting the first vector from the second vector, thereby determining the at least one basis vector;

determining a first coefficient for the basis vector and associated with a position in the second direction associated with the first vector to have a value of negative one half; and determining a second coefficient for the basis vector and associated with a position in the second direction associated with the second vector to have a value of positive one half.

8. The method of claim 4 wherein determining the function for interpolation of coefficients comprises determining a function for polynomial interpolation of coefficients.

9. The method of claim 4 wherein determining the function for interpolation of coefficients comprises determining a function for piecewise linear interpolation of coefficients.

10. An image processor that is operative to process image data of an image of an object to remove or compensate for unwanted curvature, the image processor comprising:

a feature identifier that is operative to identify a plurality of respective line-like features of the object, the plurality of line-like features extending in a first direction and being located at respective separate positions in a second direction that is orthogonal to the first direction, each respective line-like feature having a curvature that is representative of a curvature of the image at the respective position;

a feature vector determiner that is operative to determine a plurality of respective vectors representing points in the image defined by each respective line-like feature of the plurality of respective line-like features, wherein each vector of the plurality of respective vectors characterizes the curvature of the image at the respective position in the second direction of the respective line-like feature and wherein for selected positions in the first direction each respective vector includes a corresponding position of the respective line-like feature in the second direction;

a vector selector that is operative to select at least one respective subset of the plurality of vectors, the at least one respective subset including at least respective portions of selected vectors of the plurality of vectors, the respective portions including those portions of each vector in the at least one respective subset corresponding to selected positions in the first direction, the selected positions being positions for which each respective vector in the at least one respective subset includes valid feature position information and defining respective areas of interest;

a principal component analyzer that is operative to perform principal component analysis on the at least one respective subset of the plurality of vectors, thereby determining at least one respective average vector, at least one respective set of at least one respective basis vector and at least one respective set of at least one coefficient, each respective set of at least one coefficient corresponding to the respective position in the second direction of an associated respective line-like feature portion corresponding to a respective vector portion included in the respective at least one subset of the plurality of vectors, a combination of the respective set of at least one respective basis vector, a selected respective set of at least one respective coefficient and the respective average vector providing an estimate of positions in the second direction for the respective line-like feature portion associated with the selected respective set of at least one respective coefficient;

a correction estimator that is operative to determine at least one respective function describing respective relationships of the respective pluralities of respective sets of at least one coefficient to position in the second direction, to determine at least one respective set of positions of interest in the second direction, and for each position of interest in the respective sets of positions of interest in the second direction: to calculate respective sets of at least one respective coefficient for the respective at least one respective basis vector according to the determined at least one respective function and the position in the second direction of the position of interest; and to determine, for each position of interest in the second direction in a respective set of positions of interest, a respective set of position estimates in the second direction, the respective set of position estimates including an estimate, for each position corresponding to the selected positions in the first direction for which the vector portions included in the respective subset of the plurality of vectors include valid feature position information, from a combination of the respective at least one respective basis vector, the at least one calculated respective set of at least one respective coefficient corresponding to the position of interest in the second direction and the respective average vector;

an image de-warper that is operative to de-warp image data associated of the image according to the respective sets of position estimates, thereby generating a compensated version of the image data with unwanted curvature compensated for or removed; and at least one of an image data storage device that is operative to store the compensated version of the image data and a rendering device that is operative to render the compensated version of the image data wherein at least one of the feature identifier, the feature vector determiner, the vector selector, the principal component analyzer, the correction estimator, the image de-warper, the image data storage device and the rendering device is implemented in hardware or a combination hardware and software.

11. The image processor of claim 10 wherein the correction estimator is operative to determining a first set of positions of interest for determining a first set of position estimates based on a first subset of the plurality of vectors and to determine a second set of positions of interest for determining a second set of position estimates based on a second subset of the plurality of vectors, wherein determining the second set of positions of interest in the second direction comprises:

selecting respective positions in the second direction associated with positional estimates of the first set of positional estimates, the selected respective positions being those positions in the second direction associated with positions in the first direction that are closest, from among the positions in the first direction associated with the positional estimates of the first set of positional estimates, to positions in the first direction associated with a selected set of ends of vector portions included in the second subset of the plurality of vectors; and determining the second set of positions of interest to include the selected respective positions.

12. The image processor of claim 10 wherein the vector selector is operative to select a first subset of the plurality of vectors by selecting only a first vector associated with a first end of the object and a second vector associated with a second end of the object and wherein the principal component analyzer is operative to perform principal component analysis by subtracting the first vector from the second vector, thereby determining the at least one basis vector, determining a first coefficient for the basis vector and associated with a position in the second direction associated with the first vector to have a value of negative one half and determining a second coefficient for the basis vector and associated with a position in the second direction associated with the second vector to have a value of positive one half.

13. The image processor of claim 12 wherein the vector selector is operative to select the first subset of the plurality of vectors by selecting a vector associated with at least a portion of a first edge of at least one page of an open book object included in the image and is operative to select the second subset of the plurality of vectors by selecting a vector associated with at least a portion of a second edge of the at least one page of the open book object included in the image, the at least a portion of the second edge being of an edge opposite the first edge.

14. The image processor of claim 12 wherein the vector selector is operative to select the first subset of the plurality of vectors by selecting a vector associated with respective top edges or lines of text of a pair of respective facing pages of an open book object included in the image and is operative to select the second subset of the plurality of vectors by selecting a vector associated with respective bottom edges or lines text of the pair of respective facing pages of the open book object included in the image.

15. A non-transitory computer readable medium storing instructions that, when executed by at least one computational element, cause the at least one computational element to perform a method of processing image data of an image of an object to remove or compensate for unwanted curvature, the method comprising:
identifying, in the image, a plurality of respective line-like features of the object, the plurality of line-like features extending in a first direction and being located at respective separate positions in a second direction that is orthogonal to the first direction, each respective line-like feature having a curvature that is representative of a curvature of the image at the respective position;
determining a plurality of respective vectors representing points in the image defined by each respective line-like feature of the plurality of respective line-like features, wherein each vector of the plurality of respective vectors characterizes the curvature of the image at the respective position in the second direction of the respective line-like feature and wherein for selected positions in the first direction each respective vector includes a corresponding position of the respective line-like feature in the second direction;
selecting a first subset of the plurality of vectors, the first subset including at least portions of selected vectors of the plurality of vectors, the respective portions including those portions of each vector in the first subset corresponding to selected positions in the first direction, the selected positions being positions for which each respective vector in the first subset includes valid feature position information and defining a first area of interest;
performing principal component analysis on the first subset of the plurality of vectors, thereby determining a first average vector, a first at least one respective basis vector and a respective first plurality of sets of at least one coefficient, each respective set of at least one coefficient corresponding to the respective position in the second direction of an associated respective line-like feature portion corresponding to a respective vector portion included in the first subset of the plurality of vectors, a combination of the first at least one respective basis vector, a selected respective set of at least one first coefficient and the first average vector providing an estimate of positions in the second direction for the respective line-like feature portion associated with the selected respective set of at least one first coefficient;
determining a first function describing a relationship of the respective first plurality of sets of at least one coefficient to position in the second direction;
determining a first set of positions of interest in the second direction;
for each position of interest in the first set of positions of interest in the second direction:
calculating a first set of at least one respective coefficient for the at least one respective first basis vector according to the determined first function and the position in the second direction of the position of interest;
determining, for each position of interest in the second direction in the first set of positions of interest, a first set of position estimates in the second direction, the first set of position estimates including an estimate, for each position corresponding to the selected positions in the first direction for which the vector portions included in the first subset of the plurality of vectors include valid feature position information, from a combination of the at least one respective first basis vector, the at least one calculated first set of at least one respective coefficient corresponding to the position of interest in the second direction and the first average vector;
de-warping the image data associated with the first area of interest according to the respective estimated first sets of positional estimates, thereby generating a compensated version of the at least the first area of interest with the unwanted curvature compensated for or removed; and
storing or rendering the compensated version of the first area of interest.

16. The non-transitory computer readable medium of claim 15 wherein identifying, in the image, the plurality of line-like features of the object comprises identifying at least a portion of a first edge of at least one page of an open book object included in the image and identifying at least a portion of a second edge of the at least one page of the open book object included in the image, the at least a portion of the second edge being of an edge opposite the first edge.

17. The non-transitory computer readable medium of claim 15 wherein identifying, in the image, the plurality of line-like features of the object comprises identifying respective first edges or lines of text of a pair of respective facing pages of an open book object included in the image and identifying respective last edges or lines text of the pair of respective facing pages of the open book object included in the image.

18. The non-transitory computer readable medium of claim 15 wherein determining the first function describing the relationship of the respective first plurality of sets of at least one coefficient to position in the second direction comprises at least one of:
determining a function for interpolation of coefficients at positions of interest that are between positions associated with respective pairs of sets of the at least one coefficient determined according to the performance of principal component analysis, based on the determined coefficients associated with the adjacent positions; and
determining a function for extrapolation of the relationship of the respective plurality of sets of at least one coefficient to position in the second direction within the first area of interest to positions beyond the first area of interest.

19. The non-transitory computer readable medium of claim 15 wherein the method comprises:
selecting a second subset of the plurality of vectors, the second subset including at least portions of selected vectors of the plurality of vectors, the respective second portions including those portions of each vector in the second subset corresponding to a second set of selected positions in the first direction, the second set of selected positions in the first direction being positions for which each respective vector included in the second subset includes valid feature position information and defining a second area of interest;

performing principal component analysis on the second subset of the plurality of vectors, thereby determining a second average vector, a second at least one respective basis vector and a respective second plurality of sets of at least one coefficient, each second respective set of at least one coefficient corresponding to the respective position in the second direction of an associated respective line-like feature portion corresponding to a respective vector portion included in the second subset of the plurality of vectors, a combination of the second at least one respective basis vector, a selected second respective set of at least one coefficient and the second average vector providing an estimate of positions in the second direction for the respective line-like feature portion associated with the selected second respective set of at least one coefficient;

determining a second function describing a relationship of the second respective plurality of sets of at least one coefficient to position in the second direction;

determining a second set of positions of interest in the second direction;

for each position of interest in the second set of positions of interest in the second direction:
calculating a second set of at least one respective coefficient for the at least one respective second basis vector according to the determined second function and the position in the second direction of the position of interest;
determining, for each of the positions of interest in the second direction in the second set of positions of interest, a second set of position estimates in the second direction, the second set of position estimates including an estimate for each position corresponding to the second set of selected positions in the first direction for which the vector portions included in the second subset of the plurality of vectors include valid feature position information, from a combination of the at least one second respective basis vector, the at least one calculated second set of at least one respective coefficient corresponding to the position of interest in the second direction and the second average vector;

de-warping the image data associated with the second area of interest according to the estimated second set of position estimates, thereby generating a compensated version of the at least the second area of interest; and storing or rendering the compensated version of the second area of interest.

20. The non-transitory computer readable medium of claim 15 wherein selecting the first subset of the plurality of vectors includes selecting only a first vector associated with a first edge and a second vector associated with a second edge and where performing principal component analysis comprises:
subtracting the first vector from the second vector, thereby determining the at least one basis vector;
determining a first coefficient for the basis vector and associated with a position in the second direction associated with the first vector to have a value of negative one half; and
determining a second coefficient for the basis vector and associated with a position in the second direction associated with the second vector to have a value of positive one half.

* * * * *